US011074594B2

(12) United States Patent
Cassel et al.

(10) Patent No.: US 11,074,594 B2
(45) Date of Patent: Jul. 27, 2021

(54) METHOD AND SYSTEM FOR GENERATING A DATA COLLECTION PROCESS IN A USER DEVICE

(71) Applicant: Regily AB, Stockholm (SE)

(72) Inventors: Kristoffer Cassel, Stockholm (SE); Joel Cassel, Stockholm (SE); Alexey Kuznetsov, Stockholm (SE)

(73) Assignee: CHECKIN.COM GROUP AB, Stockholm (SE)

( * ) Notice: Subject to any disclaimer, the term of this patent is extended or adjusted under 35 U.S.C. 154(b) by 0 days.

(21) Appl. No.: 16/689,808

(22) Filed: Nov. 20, 2019

(65) Prior Publication Data

US 2021/0150547 A1    May 20, 2021

(51) Int. Cl.
*G06Q 30/02* (2012.01)

(52) U.S. Cl.
CPC ................. *G06Q 30/0201* (2013.01)

(58) Field of Classification Search
None
See application file for complete search history.

(56) References Cited

U.S. PATENT DOCUMENTS

| | | | | |
|---|---|---|---|---|
| 2007/0073917 A1* | 3/2007 | Larson | ................. | G06F 3/0485 710/14 |
| 2008/0294974 A1* | 11/2008 | Nurmi | ................. | G06F 16/9577 715/204 |
| 2009/0076966 A1* | 3/2009 | Bishop | ................. | G07F 7/0866 705/67 |
| 2014/0337862 A1* | 11/2014 | Valencia | ............... | G06F 21/567 719/313 |
| 2015/0248710 A1* | 9/2015 | Medvedovsky | ........ | H04L 67/18 705/14.67 |
| 2015/0293673 A1 | 10/2015 | Peters | | |
| 2016/0132948 A1* | 5/2016 | Saveliev | ............ | G06Q 10/0875 705/26.4 |
| 2016/0134554 A1 | 5/2016 | Deckers | | |

(Continued)

OTHER PUBLICATIONS

Regily—Kristoffer Cassel, vimeo excerpt, Aug. 7, 2018 https://vimeo.com/283696673 (Year: 2018).*

(Continued)

*Primary Examiner* — Octavian Rotaru
(74) *Attorney, Agent, or Firm* — RMCK Law Group, PLC

(57) ABSTRACT

The invention relates to a computer implemented method and system for generating a data collection process for a user device. The method comprises: receiving, at a third-party server, an instruction to begin a data collection process for a user operating a user device; receiving, at the third-party server, static data from the user device; determining, at the third-party server, a set of data to be collected from the user; generating, at the third-party server, code for a first data collection module based on the set of data to be collected from the user; providing, from the third-party server, the code for generating the first data collection module to the user device; receiving, at the third-party server, confirmation that a user of the user device has provided the information required by the first data collection module to the service-provider server; and determining if the user has provided the set of data to be collected.

22 Claims, 5 Drawing Sheets

(56) References Cited

U.S. PATENT DOCUMENTS

| | | | |
|---|---|---|---|
| 2016/0195856 A1* | 7/2016 | Spero | G06N 5/046 |
| | | | 700/90 |
| 2017/0192948 A1 | 7/2017 | Gaither et al. | |
| 2017/0213225 A1 | 7/2017 | Gebhardt et al. | |
| 2017/0372029 A1* | 12/2017 | Saliman | G16H 10/60 |
| 2019/0020730 A1* | 1/2019 | Singamsetty | H04W 4/50 |
| 2019/0155894 A1 | 5/2019 | Gandhi et al. | |
| 2019/0213262 A1* | 7/2019 | Xu | G06F 9/451 |
| 2019/0310701 A1 | 10/2019 | Meenakshisundaram et al. | |
| 2019/0384253 A1* | 12/2019 | Ozeki | G06N 20/00 |
| 2020/0013032 A1* | 1/2020 | Moskowitz | G06Q 20/3563 |

OTHER PUBLICATIONS

PCT International Search Report and Written Opinion dated Feb. 18, 2021 for International Application No. PCT/EP2020/082234, 13 pages.

* cited by examiner

METHOD AND SYSTEM FOR GENERATING A DATA COLLECTION PROCESS IN A USER DEVICE

FIELD OF THE INVENTION

The present invention relates to a method and system for generating a data collection process in a user device. In particular, the invention relates to the generation of a data collection process which is adapted to suit an individual and specific user and user device in order to simplify data collection from such individual and specific user and user device.

BACKGROUND OF THE INVENTION

Many organizations with an online presence want to ask their users for some personal information or other data. Many times, this data collection is a required step to start using the product or service provided. It is therefore desirable to simplify this step for the user in order to increase the number of users performing such steps, and thereby increasing the use of the product, service or similar that is being offered.

Online methods of data collection and customer registration/sign ups on web sites and the like have more or less had the same look and feel during numerous years. Through existing methods, individuals and users are requested to use standardized and static online forms to manually fill in data or manually verify certain pre-populated data, mainly through the use of keyboards. Existing methods of data collection are often standardized, not taking individual user parameters and/or user device information into account.

An important metric for web site operators and other parties using an online registration or data collection process is user conversion, or user conversion rate, which defines the number or percentage of users initiating a data collection process that proceeds to complete the process. In order to improve user conversion, tools such as an autofill functionality and other means for automatically gathering user information can be employed. However, many existing data collection procedures may still be seen as tedious and/or complicated, making the data collection process an obstacle for the user.

Accordingly, it is desirable to further simplify the registration/data collection process on e.g. web sites in order to increase user conversion.

SUMMARY

In view of the above-mentioned and other drawbacks of already existing art, an object of the present invention is to provide an improved method and system for simplifying the data collection process for a user when such user is required to provide information, e.g. when signing up for services or when sharing data on a website. This is achieved by an automated and interactive method and system for generating an optimized (i) method and manner to collect the required data from an individual user, and (ii) data collection sequence in such user device.

According to a first aspect of the invention, a computer implemented method for generating a data collection process is provided, including both the sequence and manner in which the data is collected in a user device. The method comprises: receiving, at a third-party server having at least one processor, an instruction to begin a data collection process for a user operating a user device, the instruction being sent from a service-provider server requesting data from a user; receiving, at the third-party server, static data from the user device; determining, at the third-party server, a set of data to be collected from the user, the set of data comprising at least one data item; generating, at the third-party server, code for a first data collection module based on the set of data to be collected from the user, the first data collection module being configured to collect at least one data item from the set of data to be collected from the user; providing, from the third-party server, the code for generating the first data collection module to the user device; receiving, at the third-party server, confirmation that a user of the user device has provided the information required by the first data collection module to the service-provider server; and determining, in the third-party server, based on the received confirmation, if the user has provided the set of data to be collected from the user to the service-provider server. In the event further data is to be collected, the method further comprises repeating the above process albeit with subsequent data collection module(s) being based on collected static data, collected dynamic data and the set of data already collected from the user.

In the present context, a service provider may be considered to include any online service provider providing a service which requires actively collecting data from a user. The service provider may for example be a payment service provider, an insurance provider, a gambling service provider, a bank, an authority or any other online service provider. Moreover, the data collection process may be part of a sign-up or registration process such as the creation of a user account, or it may be used for gathering user information for other purposes.

The user device can be any electronic device which can be used to access the service-provider server for example via a web site hosted by the service provider server. The user device may for example be a stationary computer, a laptop, a tablet computer, a smartphone, a smartwatch or other types of user terminals capable of connecting the service-provider server and generating content based on code provided by the service-provider server. Preferably, the user device is capable of generating a web page based on code provided by the service-provider server, such as html code or similar. Moreover, the user device is any device which is configured to be used by a user in order to provide information in some form. Accordingly, an interaction with the user device, by the user, is required for providing information to the service-provider server. In other words, the generated data collection process includes prompting a user to interact with the user device, meaning that the user device is equipped with some form of user interface comprising both output and input means. The user device may for example be provided with output means such as a display, a speaker or haptic technology, and with input means such as a touch sensitive display, a keyboard, a joystick, a microphone, a camera, motion sensors and the like. The user device may thus be equipped with a graphical user interface, an audio user interface, and/or a haptic user interface.

The third-party server, which may comprise one or more processors and data storage units, is responsible for generating the code resulting in a data collection process where at least one data item is provided by the user via the user device and transmitted on to the service-provider server. The data collection process includes generating code for individually adapted data collection modules to be presented on or otherwise executed by the user device. Accordingly, the functionality of the third-party server, which may be collectively referred to as a data collection framework, generates code corresponding to a data collection module most suitable for the individual user and user device, wherein the code in turn is transmitted to the user device. When the code is executed on the user device, a data collection module specifically targeting the individual user is generated on the user device and presented to the user by means of any of the aforementioned interfaces.

The present invention is based on the realization that the user experience of a data collection process can be significantly improved by adapting the process based on information available on the user device (static data) which is used to perform the data collection, based on the user interactions and input behavioral patterns (dynamic data), and based on data already collected from the user so that the data collection process can be optimized based on the specific circumstances of a given user and user device. The described data collection process including the generation of code for data collection modules to be presented to the user is thereby based on input parameters such as time of day, what type of data to collect, statistical analysis of behavioral patterns of users and historical success rates of certain registration modules. By improving the user experience, the user conversion rate is also increased, i.e. the likelihood that the user completes the data collection process.

The described third-party server can furthermore in principle be seamlessly inserted in the communication between the user device and the service-provider server and can be branded so that the use of the third-party server for optimizing the data collection process may be invisible to the user. However, no personal data needs to be stored on the third-party server, even though the third-party server is responsible for managing the data collection process. Thereby, privacy concerns and other legal requirements relating to handling of personal and identifying data does not primarily have to be addressed by the operator of the third-party server. It should be noted that it would in principle be possible to store user data on the third-party server, either temporarily or permanently, should that be desirable.

A further advantage of the claimed invention it that there is no need for the service-provider to substantially modify the internal workings of its systems for improving an existing data collection process. Instead, the service-provider can adopt the data collection framework provided by the third-party server e.g. by inserting a script or code snippet on a service-provider web page which calls the third-party server and initiates the data collection process when a user accesses the information gathering part of the service-provider web site.

Moreover, for a data collection process requiring a number of data items to be collected, the data collection process may result in a sequence and design of data collection modules, where the resulting sequence and design are determined by the data collection framework on the third-party server. Here, it should be noted that the sequence of data items to be collected as such is not predetermined. Instead, for each data item to be collected the most suitable data collection module is selected and generated, meaning that for a given set of data to be collected, the specific sequence or way of collecting the data items may be different for different users and user devices.

The third-party server, as well as the service-provider server, may be implemented in a cloud computing environment. The functionality of the third-party server may thereby be distributed across several different locations and physical systems.

According to a second aspect of the invention, there is provided a system for generating a data collection process in a user device. The system comprises: a third-party server having at least one processor, the processor of the third-party server being configured to: receive an instruction to begin a data collection process for a user operating a user device, the instruction being sent from a service provider server requesting data to be collected from a user; receive static data from the user device; initiate a data collection sequence generator upon receipt of the instruction to begin a data collection process; determine a set of data set to be collected from the user; generate code for a first data collection module based on the set of data to be collected from the user, the first data collection module being configured to request at least one data item from the set of data to be collected from the user; provide the code for generating the first data collection module to the user device; receive confirmation that a user of the user device has provided the information required by the first data collection module to the service-provider server; and determine, based on the received confirmation, if the user has provided the set of data to be collected from the user to the service provider server.

According to a third aspect of the invention, there is provided a system for generating a data collection process in a user device. The system comprises: a third-party server having at least one processor; a user device having at least one processor; and a service-provider server having at least one processor; the system being configured to: by the third-party server, receive an instruction to begin a data collection process for a user operating a user device, the instruction being sent from the service provider server requesting data from a user; provide static data from the user device to the third-party server; by the third-party server, initiate a data collection sequence generator upon receipt of the instruction to begin a data collection process from the third party-server; by the third-party server, determine a set of data set to be collected from the user; by the third-party server, generate code for a first data collection module based on the set of data to be collected from the user, the first data collection module being configured to collect at least one data item from the set of data to be collected from the user; by the third-party server, provide the code for generating the first data collection module to the user device; by the user device, generating the first data collection module and prompting the user to provide information by interacting with the data collection module; by the user device, provide the information acquired by the first data collection module to the service provider server; by the third-party server, receive confirmation that a user of the user device has provided the information required by the first data collection module to the service-provider server; and by the third-party server, determine, based on the received confirmation, if the user has provided the set of data to be collected from the user to the service provider server.

Additional effects and features of the second and third aspects of the invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1:
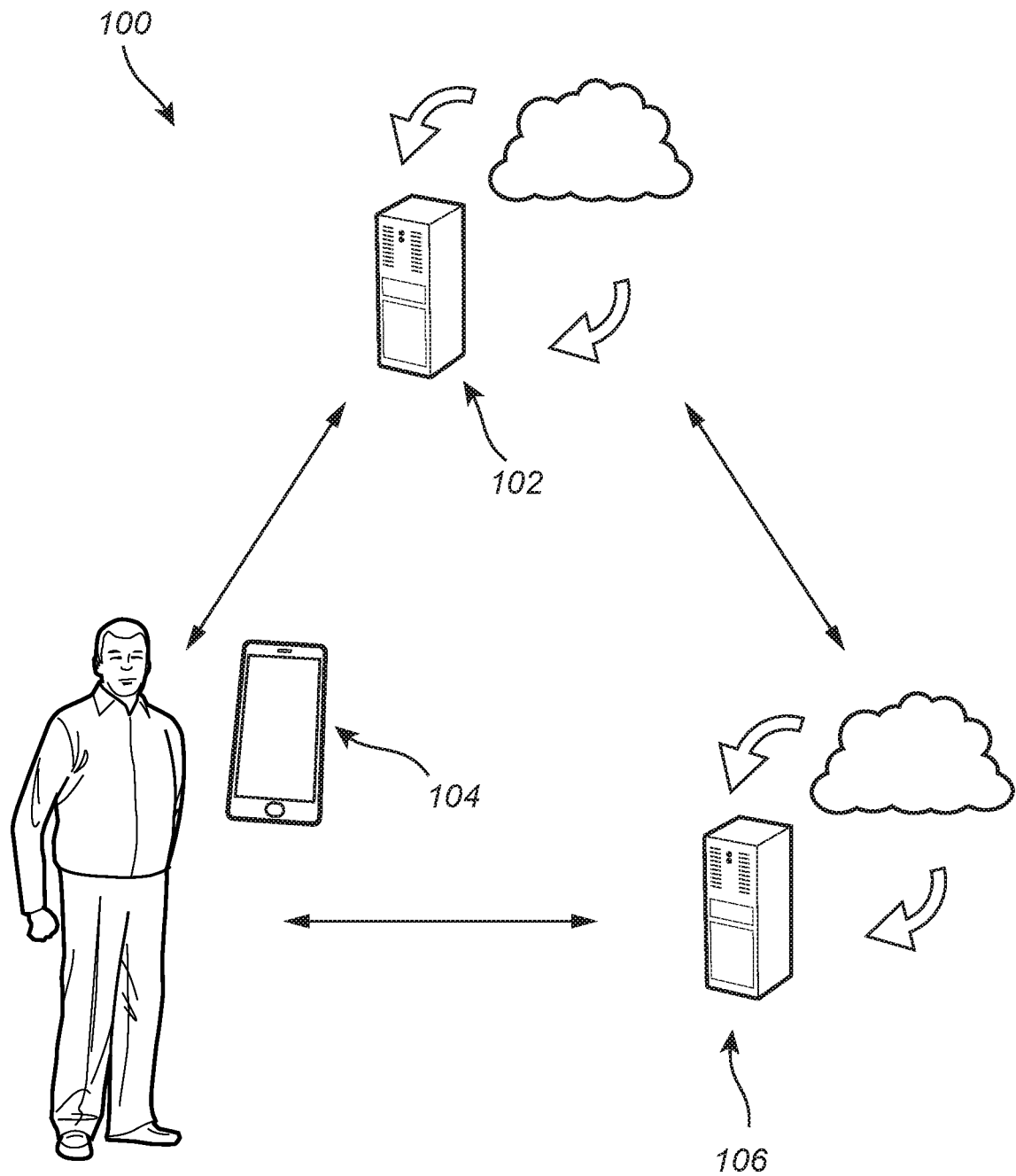
FIG. 1 schematically illustrates a system for generating a data collection process in a user device according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and convey examples of the scope of the invention to the skilled person. Like reference characters refer to like elements throughout.

In the present detailed description, various embodiments of the system and method according to the present invention are mainly described with reference to a data collection process where a user visits a service-provider web site by means of a user device such as a smartphone, and where the service provider requires a number of data items to be provided for completing the collection of data from the user. However, the skilled person readily realizes that the described data collection process is applicable for a range of different applications.

FIG. 1 is a schematic illustration of a system for generating a data collection process 100 comprising a third-party server 102 having at least one processor, a user device 104 having at least one processor; and a service-provider server 106 having at least one processor.

The functionality of the described components is governed by software algorithms executed on the respective processors. Preferably, the software algorithm is implemented as coded instructions stored in a memory and executed by the processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, sensors, etc., as described herein.

Moreover, the described third-party server and service-provider server may be implemented in a cloud computing environment where both data processing and memory is distributed over a number of physical devices which may be located at different geographical locations.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in the memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Figure 2:
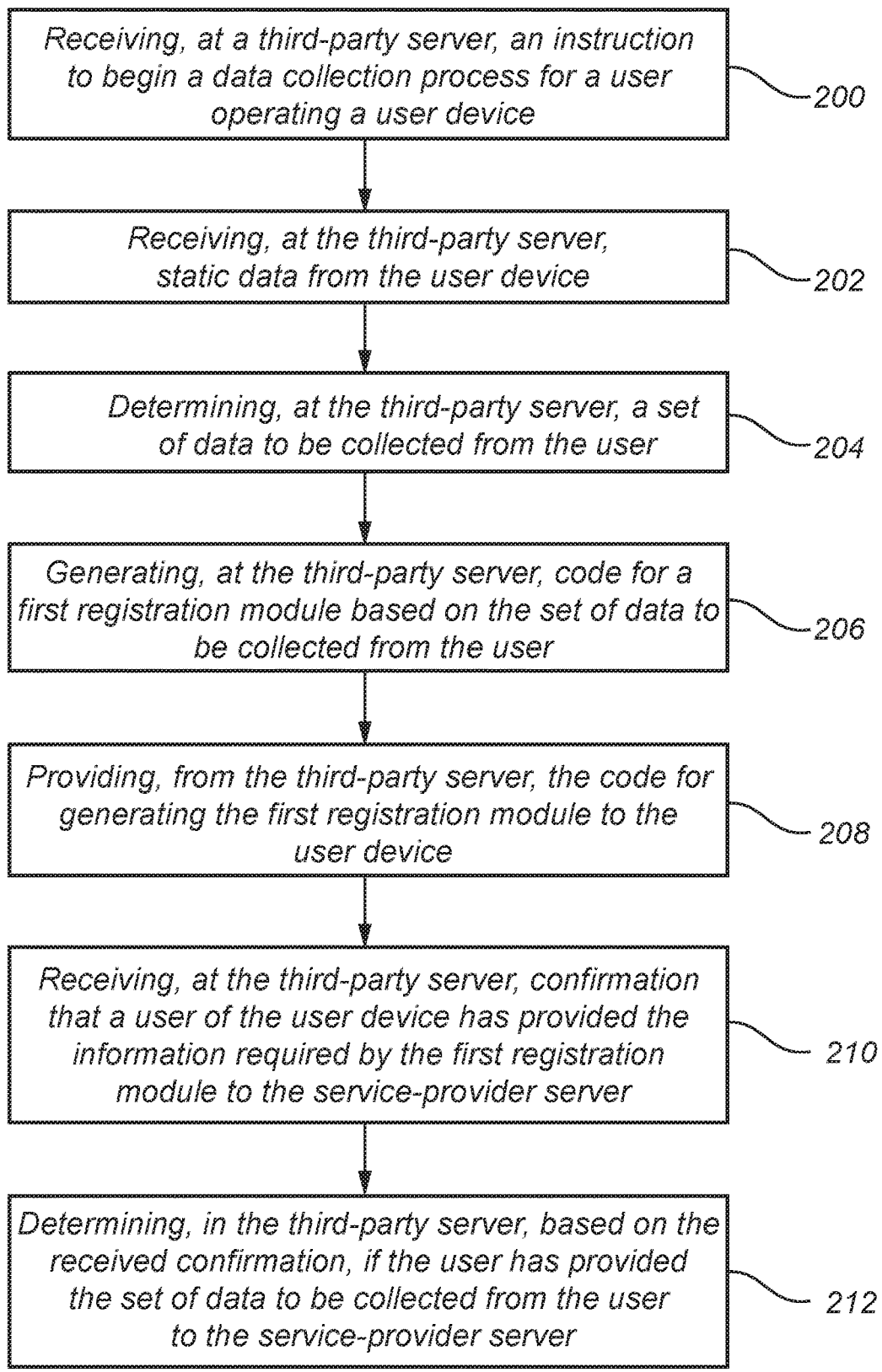
FIG. 2 is a flow chart outlining general steps of a computer implemented method for generating a data collection process in a user device according to an embodiment of the invention.

FIG. 2 is a flow chart outlining the general steps of the computer implemented method for generating a data collection process for a user device. Accordingly, the flow chart can be seen as an illustration of the algorithm being executed by the processor of the third-party server, i.e., the processor of the third-party server is programmed and configured to perform the described steps of the computer implemented method. The method will be described with further reference to FIGS. 3A-D outlining the communication between the third-party server 102, the user device 104 and the service-provider server 106 for selected steps of the method.

Figure 3A:
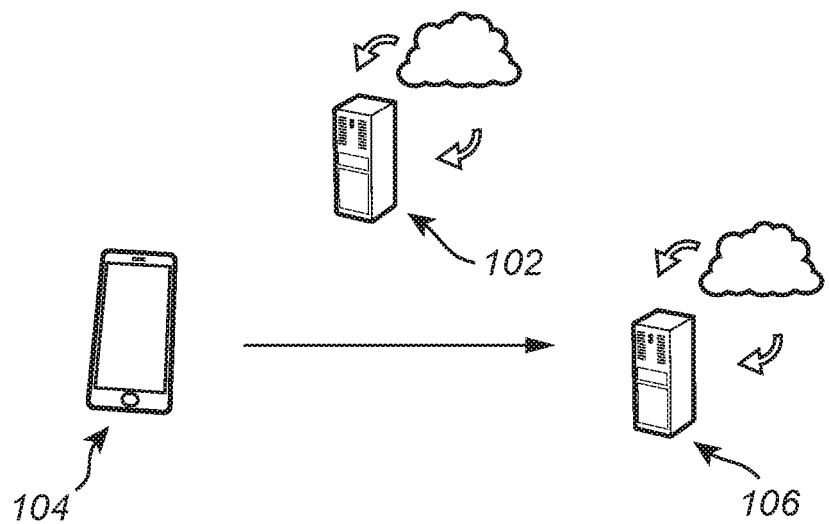
FIGS. 3 A-D schematically illustrate steps of a method according to an embodiment of the invention.
Figure 3B:
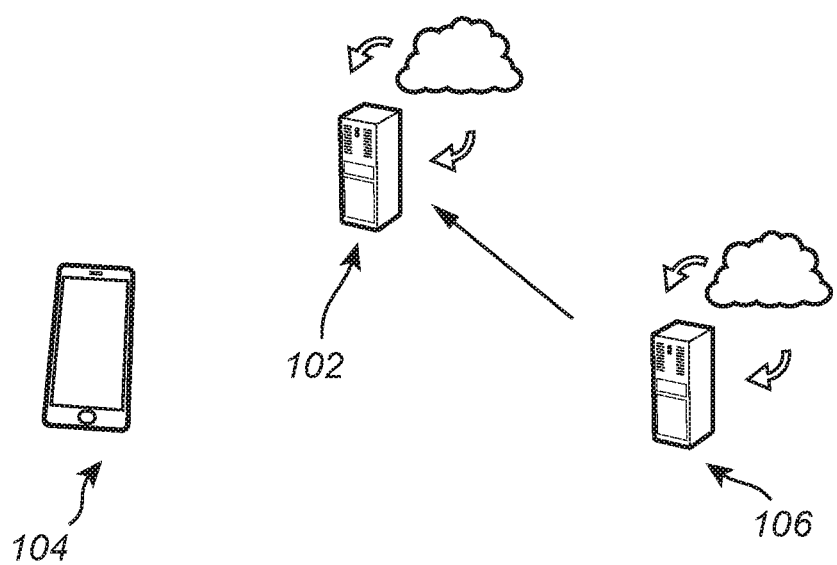

The method first comprises the step of receiving 200, at the third-party server 102 having at least one processor, an instruction to begin a data collection process for a user operating a user device 104, the instruction being sent from a service-provider server 106 requesting data to be collected from a user. In a non-limiting example, the service-provider server 106 may for example be a server operated and controlled by a bank and the user may be an individual desiring to become a customer at the bank. The user may then access a web page hosted by the service-provider server 106 where the user is required to provide certain personal information for registering at the bank, and where a first step may be to create a user account. Once the user has navigated to the specific web page where a data collection process is required as schematically illustrated by FIG. 3A, the service-provider server 106 transmits a request to the third-party server 102 indicating that a data collection process is to be initiated on the third-party server 102, illustrated by FIG. 3B.

The next step of the method comprises receiving 202, at the third-party server 102, static data from the user device 104. In the present context, static data is non-personal data that defines the state of the user device at the start of the data collection process, and which for example may be retrieved from a memory unit of the user device 104.

The static data is in general data that does not change during the data collection process, or at least not during a data collection session. A data collection session can be seen as an uninterrupted data collection process which is not aborted by either the user, the user device or by the service-provider server. The static data received from the user device may comprise one or more of the following data items: Timestamp, Day of month, Month, Day of week, Hour of day, deviceType Seen before, userID, Device, Device version, Distance from latest device version, Browser, Browser Version, Distance from latest browser version OS, OS Version, Distance from latest OS version, partnerId, screen resolution (multiplied), country, Language, Landscape orientation and Network latency. Accordingly, certain data is static in the sense that it does not change at all during the data collection session, while some static data may change, such as timestamp, date and the like. According to an embodiment of the invention, static data is only collected at one point in time, which is at the start at the data collection process. However, it would in principle be possible to update the static data at selected times during the data collection process. The static data may for example be retrieved from a local data storage of the user device 104 where information corresponding to the above described static data is stored.

In practice, code for gathering static data on the user device 104 may be embedded in the server-provider web page so that when the web page is generated on the user device 104, the code for gathering static data is executed on the user device 104, and static data is automatically gathered on the user device 104 and transmitted to the third-party server 102. Accordingly, one embodiment of the described method may comprise, at the third-party server 102, generating code for gathering static data that when executed on the user device 104 gathers static data from the user device 104 and sends the gathered static data to the third-party server 102.

Figure 3C:
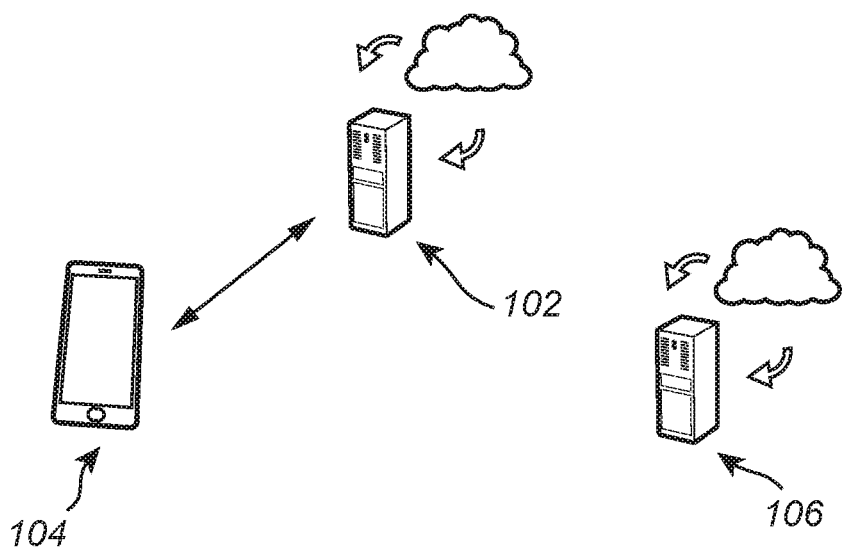

In one embodiment of the invention, the method further comprises: receiving, at the user device 104, code from the service-provider server 106; and executing the code on the user device 104, wherein the code is configured to make the user device 104 request code from the third-party server 102. Accordingly, the code which the user device 104 receives from the service-provider server 106 for generating the service provider web page may comprise additional code making the user device 104 call the third-party server 102 requesting code for e.g. providing static data as illustrated in FIG. 3C. Thereby, the user device 104 is provided with code enabling communication between the user device 104 and the third-party server 102.

In the following step, a set of data to be collected from the user is determined 204 at the third-party server 102, the set of data comprising at least one data item. The set of data to be collected is defined by the one or more data items to be collected from the user.

The information describing a set of data to be collected from the user may be predefined, and such information defining a set of data may be stored on a data storage unit of the third-party server 102 for a given known service-provider server 106. It would also be possible to retrieve, by the third-party server, information related to the set of data to be collected from the service-provider server 106. In other words, at the start of the data collection process, information defining the data items to be collected may be transmitted from the service-provider server 106 to the third-party server 102. Each data item defines a certain type of information about the user such as the name of the user, user address, user identifying number, phone number, email address and the like. Accordingly, a data item describes the type of information to be requested from the user.

The next step of the method comprises generating 206, at the third-party server 102, code for a first data collection module based on the set of data to be collected from the user, the first data collection module being configured to collect information defined by at least one data item from the set of data to be collected from the user.

The software on the third-party server 102 responsible for generating the code for the one or more data collection module(s) can be seen as a data collection framework which is initiated upon receipt of the instruction to begin the data collection process. The software framework and functionality of the third-party server 102 may also be referred to as a data collection sequence generator. That the third-party server 102 generates the data collection process should be understood as the third-party server 102 being responsible for generating the code required for performing the data collection process on the user device 104, and that the data collection process is controlled by the third-party server 102.

The code for the first data collection module may further be based on static data so that the resulting data collection module is optimized based on the static data. Moreover, the first data collection module may be selected from a library comprising module templates where, the template (i.e. the method of data collection as well as the design of the module to be presented to the user) for collecting a certain data item can be adapted and optimized based on the static data. The library of data collection module templates may be stored locally on the third-party server 102, or it may be stored at a remote location accessible by the third-party server 102.

Furthermore, the set of data items to be gathered can be seen as a list of data items, and the first data collection module can be selected to collect one or more of the data items from the list of data items. Moreover, the data items do not have to be collected in any specific or predetermined order.

Once the described code has been generated at the third-party server 102, the method comprises providing 208, from the third-party server 102, the code for generating the first data collection module to the user device 104 as illustrated in FIG. 3C.

When the code for generating the first data collection module is executed on the user device 104, the user is presented with a data collection module aiming to collect at least one data item from the user. The data collection module is thus automatically generated by the user device without any input from the user. In one embodiment of the invention, the data collection module may include one or more input fields prompting the user to provide information into the input field followed by a confirmation that the input is completed. However, the data collection module may be manifested in many different ways as will be described in further detail in the following.

According to one embodiment of the method, the data collection module may read information from a local data storage of the user device 104 and present the information to the user for verification, for example where an autofill-functionality of a web-browser of the user device is utilized for populating one or more fields of a data collection module. In the described example, the user will be prompted to confirm the information provided to a data collection module prior to providing the data to the service-provider server 106. Accordingly, the information is not provided to the service-provider server 106 without approval from the user. Moreover, the approval is preferably explicit meaning that an action needs to be taken by the user to give the approval. Thereby, prompting the user to approve information is connected to a request for action from the user. It may be required that the user is prompted to approve any information to be provided to the service-provider server.

The data collection modules may be generated in many different forms and a data collection module for collecting a specific data item, such as an email address, may be presented in many different ways in terms of graphical appearance and in terms of the input means required for interacting with the data collection module. In principle, the data collection module does not have to include a visual or graphical component, the data collection module may instead be audio-based. Accordingly, the data collection module is fully customizable to suit a specific user and user device in a specific situation.

Moreover, the method may comprise, at the third-party server 102, adapting a visual appearance of a data collection module based on a visual appearance of the service-provider website. A graphical profile of the service provider website may be pre-stored on the third-party server 102 so that data collection modules are generated and branded to have a similar graphical profile, thereby providing a seamless experience for the user where the data collection modules are recognizable as belonging to the visited website. It is also possible that the third-party server 102 comprises functionality for scanning a website of the service-provider server 106 to determine a visual appearance of the website, and to subsequently generate code for generating a data collection module based on the determined visual appearance. The data collection modules can thereby be styled to match the graphical profile of a service-provider without any prior knowledge of the service-provider. The visual appearance of a data collection module may also be further modified by a machine learning or artificial intelligence algorithm.

It should be noted that the main goal when selecting which data collection module to be used is to make the user complete the data collection process. Accordingly, a data collection module is not selected based only on a likelihood that the user will provide information corresponding to the currently requested data item. Instead, the selection of the data collection module for a given data item is selected based on a likelihood that the user will complete the data collection process. Thereby, the likelihood that the user completes the data collection process can be maximized through the selection of data collection modules for the different data items.

Figure 3D:
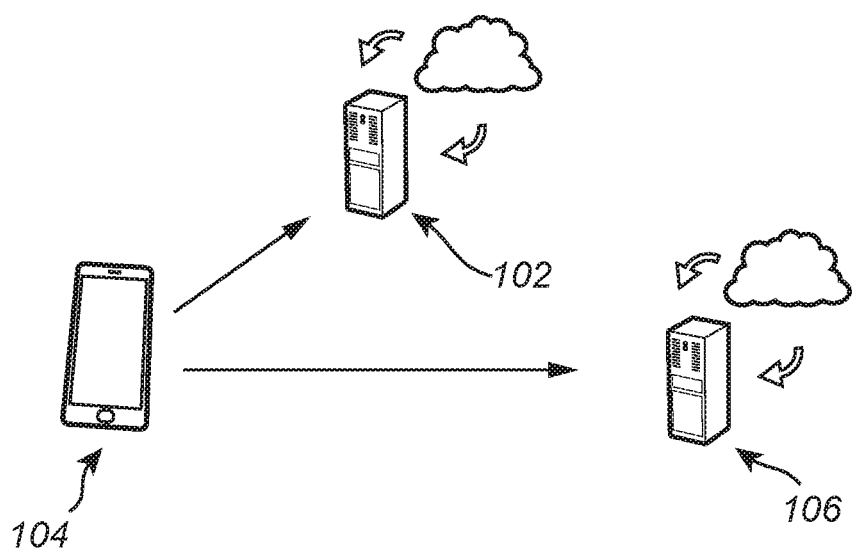

When the user has provided the requested information to the data collection module, the information is transmitted from the user device 104 to the service-provider server 106 as illustrated by FIG. 3D. The method further comprises, receiving 210, at the third-party server 102, confirmation that a user of the user device 104 has provided the information required by the first data collection module to the service-provider server 106. Since the third-party server 102 only receives a confirmation that the information is sent from the user device 104 to the server-provider server 106, the specific information entered into or otherwise provided to the data collection module by the user does not have to be transmitted to the third-party server 102. The third-party server 102 may also receive a confirmation from the service-provider server 106 verifying that the information has been properly received by the service-provider server 106 and that the information is valid.

It may be preferred that the data item is removed from the set of data items to be collected from the user only when the third-party server 102 has received confirmation that the information corresponding to a specific data item has been properly received by the service-provider server 106.

There may be situations where the information provided to the server-provider server 106 is not valid, meaning that the data item or items cannot be removed from the list of data items to be requested from the user. One such example is if the user is prompted to provide a username, and if the provided username is not available, thereby requiring the user to enter another username. In such a situation, it is not required that the data collection module requesting a data item such as the username for the second time is the same as the data collection module used for requesting data item the first time.

Furthermore, the final step of the described method comprises determining 212, in the third-party server 102, based on the received confirmation, if the user has provided the set of data to be collected from the user to the service-provider server 106. If the set of data is defined as a list of data items, a confirmation that the set of data to be collected has been provided to the service-provider server 106 may comprise receiving a confirmation that the last, or only remaining, data item on the list of data items has been properly received by the service-provider server 106. If it can be confirmed that all of the data items have been provided, the data collection process is completed, and the third-party server 102 can end the data collection process. Ending the data collection process on the third-party server 102 may for example comprise providing information to the user device 104 and/or to the service-provider server 106 that all of the data items in the set of data to be collected from the user has been confirmed as received by the service-provider server 106.

It is also possible to use the described functionality of generating code for data collection modules on the third-party server in order to provide modules to the user device which are of an informative nature, i.e. which are not aimed at collecting information from the user but that instead may be used to guide the user through the data collection process.

Figure 4:
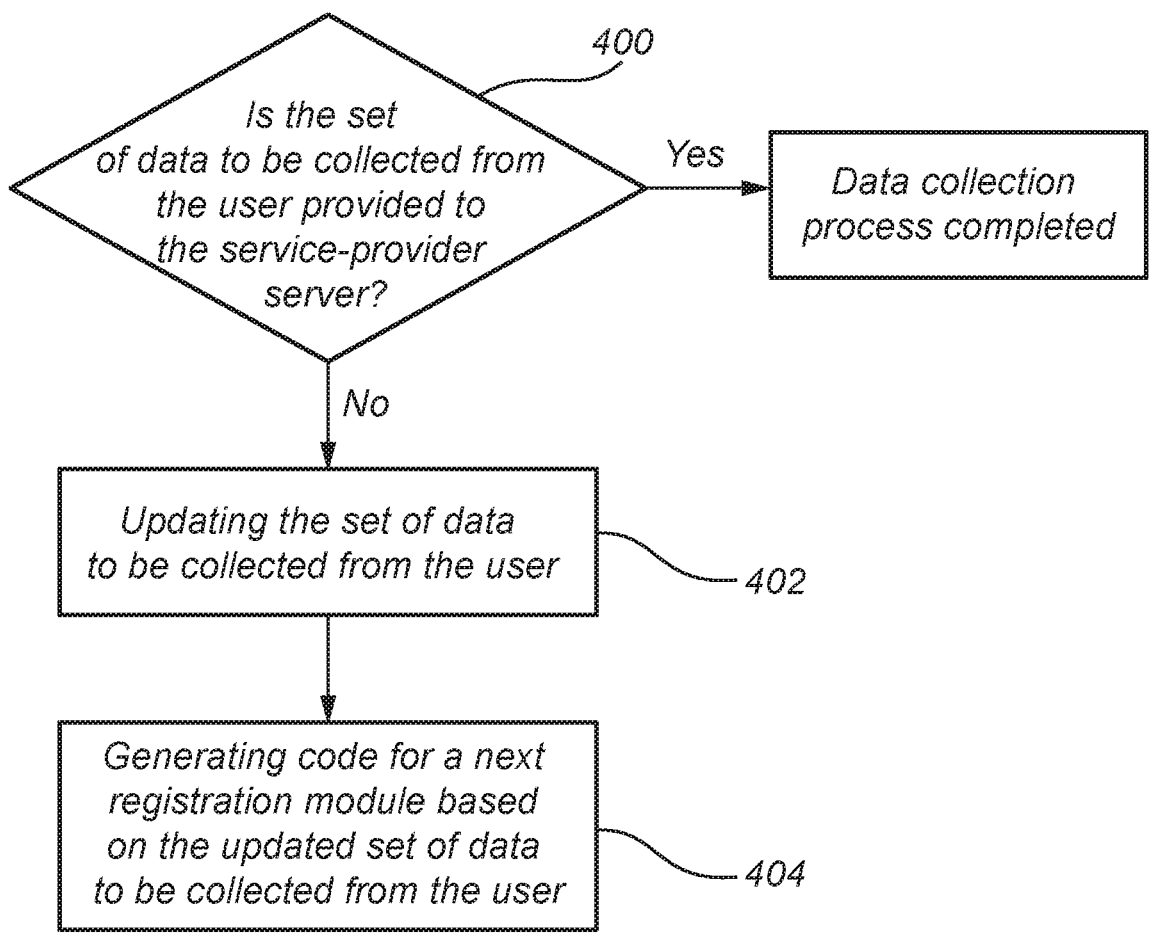
FIG. 4 is a flow chart outlining further steps of a computer implemented method for generating a data collection process in a user device according to an embodiment of the invention.

According to an embodiment of the method illustrated by the flow chart of FIG. 4, the method may further comprise: if 400 it is determined that the user has not provided the set of data to be collected from the user to the service-provider server 106, updating 402 the set of data to be collected from the user; generating, by the third-party server 102, code for a next data collection module based on the updated set of data to be collected from the user, the next data collection module being configured to collect at least one data item from the updated set of data to be collected from the user; and providing 404 the code for generating the next data collection module to the user device 104. Accordingly, if the data collection process is not completed, a next data collection module is required.

A call from the user device 104 to the service-provider server 106 providing the information of a data collection module may at the same time include a request for a next data collection module from the third-party server 102.

The code for the next data collection module, and any following required data collection modules, may be generated not only based on the static data but also based on dynamic data acquired by the third-party server 102 during the data collection process, e.g. during user interaction with previous data collection modules on the user device 104. The computer implemented method may thus comprise, at the third-party server 102, generating code for gathering dynamic data that when executed on the user device 104 gathers dynamic data and sends the gathered dynamic data to the third-party server 102.

The dynamic data is data that could be expected to change during the data collection process. Examples of dynamic data include which data items remain to be collected, the type of input used by the user for the latest or any previous data collection module, the data collection module or modules that have been shown to the user, keystroke latency, median latency per input field group for a data collection module comprising input fields, tab key usage, enter key usage and any other type of information describing the behavior of the user. The code for a data collection module may also be generated based only on dynamic data gathered during the data collection session and on the set of data to be collected from the user. Accordingly, the method may also comprise providing code from the third-party server to the user device for gathering dynamic data from the user device. Such code may be provided at the start of the data collection process so that dynamic data is continuously gathered, or it may be a part of the functionality of the data collection modules.

Thereby, according to one embodiment of the invention, the code for a data collection module is generated, by the third-party server 102, based on a generated data collection module previously provided to the user device 104. An advantage of the described method is thus that a next data collection module can be adapted based on how a user interacted with a previous data collection module, i.e. based on dynamic data. For example, if the user took a longer time than expected to interact with a previous module, this may be an indication that the user had difficulties in interacting with the data collection module and another type of module may be selected as the next module. Thereby, the data collection process can be continuously adapted based on the detected user interaction. This also means that the third-party server 102 gathers dynamic data throughout the data collection process in order to optimize the data collection process based on the detected user interaction with the data collection modules.

Moreover, when a first data collection module is completed, the data item or items corresponding to the data collected by the first data collection module is removed from the set of data to be collected, and an updated set of data is formed. Forming an updated set of data may for example include reorganizing the list of data items so that the data collection sequence is changed. Which data item to select next from the updated set of data can thereby be based on both static and dynamic data, which in turn results in a sequence of data collection modules which is determined dynamically as a result of various parameters of the data collection session.

According to one embodiment of the invention, the method may thus further comprise repeating the steps of generating code for a data collection module and providing the code for the data collection module to the user device 104 until it is determined at the third-party server 102 that the user has provided the set of data to be collected from the user to the service-provider server 106.

According to one embodiment of the invention, the method may further comprise, by the data collection module on the user device 104, presenting a plurality of predefined options on the user device 104 and prompting the user to select one of the plurality of predefined options. The predefined options may for example be based on the static information, on dynamic information and/or on other information previously provided by the user. It should however be noted that this is only one example of how the user is presented with information, and that many different examples are feasible.

According to one embodiment of the invention, the third-party server 102 may further comprise a machine learning algorithm configured to modify the generation of code for each data collection module based on the user's interaction with a previously generated data collection module. Thereby, the software framework for generating the data collection modules can operate based on previously acquired knowledge of user behavior, and also change the functionality and design based on observed behavior during the current data collection session. The software framework of the third-party server 102 including the machine learning algorithm can be seen as an artificial intelligence which is using historical data, static data and dynamic data to determine both how each data collection module is to be presented to a user, and also in which order the required information is collected.

The technical purpose of the machine learning algorithm is to present a data collection module to the user which leads to the highest likelihood that the data collection process is completed. If a previous data collection process was unsuccessful or aborted by the user for a given type of user and user device, the machine learning algorithm may adapt and change the choice or presentation of data collection modules for a user and user device of the same type. The technical effect of the described machine learning algorithm is that the code defining data collection modules is generated based on previously stored knowledge of user behavior so that the data collection process can be optimized based on the user and the user device.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

By means of the various embodiments of the current invention, an individually adapted and user-friendly data collection process is provided. Throughout the data collection process, the experience is individually adapted to the user and user device so that for example the sequence in which such data is collected, the design of how data is collected and the manner in which such data is to be collected is dependent on information available regarding the user and user device, thereby maximizing the likelihood that each user completes the data collection process.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A computer implemented method for generating code for implementing a data collection process between a user device and a service-provider server, the method comprising:

pre-storing, on a third-party server, a graphical profile of an website of a service provider to allow data collection modules to be generated to have a graphical profile similar to the website of the service provider;

receiving, at a third-party server having at least one processor, and from the service-provider server, an instruction to begin the data collection process for a user operating on the user device;

receiving, at the third-party server, static data from the user device, the static data comprising a network latency state of the user device during the data collection process;

determining, at the third-party server, a required set of data of a number of data items to be collected by the service-provider server from the user operating on the user device;

scanning, by the third-party server, the service provider website to identify a visual appearance of the service provider website, and based on said identified visual appearance, further generating the code for a first data collection module to be styled to match the graphical profile of the service-provider website without any prior knowledge of the service provider, wherein the generating of the code for implementing the data collection process is further based on: (i) dynamic data comprising one or more of: keystroke latency and median latency per input field group, and further based on (ii) the static data;

providing, from the third-party server, the code to the user device such that the code is executed by the user device to collect the data items from the required set of data and to transmit the collected data items to the service-provider server;

adapting a machine learning algorithm, of the third party server, to change a choice of the data collection modules for same type of the user and the user device in response to the first data collection module being detected as aborted by the user;

modifying the generated code further for each of the data collection modules based on the user's interaction with the first data collection module, wherein a particular visual appearance of each of the data collection modules is further modified by the machine learning algorithm;

repeating the generating of the code and the providing of the code to the user device until the third-party server determines that the user has provided all of the required set of data to the service-provider server;

receiving, at the third-party server, confirmation that the user of the user device has provided the collected data items to the service-provider server; and determining, at the third-party server, based on the received confirmation, that the user has provided the required set of data collected from the user to the service-provider server.

2. The computer implemented method according to claim 1,
wherein repeating the generating of the code comprises:
determining, at the third-party server, that the user has not provided all of the required set of data to the service-provider server;
determining, at the third-party server, a remaining portion of the required set of data to be collected from the user;
generating, by the third-party server, additional code for a next data collection process based on the remaining portion, the next data collection process being configured to collect one or more additional data items to be collected from the user; and
providing, from the third-party server, the additional code to the user device such that the additional code is executed by the user device to collect the one or more additional data items from the remaining portion of the required set of data and to transmit the one or more collected additional data items to the service-provider server.

3. The computer implemented method according to claim 1, further comprising generating, at the third-party server, static data code for gathering the static data that when executed on the user device gathers the static data and sends the gathered static data to the third-party server.

4. The computer implemented method according to claim 1, further comprising generating, at the third-party server, dynamic data code for gathering the dynamic data that when executed on the user device gathers the dynamic data and sends the gathered dynamic data to the third-party server.

5. The computer implemented method according to claim 4, wherein the code for the data collection process is generated based on properties of the dynamic data acquired during the data collection process.

6. The computer implemented method according to claim 1, wherein generating the code for implementing the data collection process is further based on previously generated code for implementing a previous data collection process that was previously provided to the user device.

7. The computer implemented method according to claim 1, wherein information describing the required set of data to be collected from the user is predetermined and information on what type of data to be collected is stored on a data storage unit of the third-party server for the service provider.

8. The computer implemented method according to claim 1, further comprising:
receiving, at the user device, initiating code from the service-provider server; and
executing, at the user device, the initiating code such that the user device requests the code for implementing the data collection process from the third-party server.

9. The computer implemented method according to claim 1, further comprising, prompting, at the user device, the user to approve collection of the data items from the required set of data prior to transmitting the collected data items to the service-provider server.

10. The computer implemented method according to claim 1, further comprising:
generating additional code for a next data collection process data until the third-party server determines that the user has provided the required set of data to be collected from the user to the service-provider server.

11. The computer implemented method according to claim 1, further comprising, adapting, at the third-party server, the visual appearance of the data collection process based on the visual appearance of the website of the service provider.

12. The computer implemented method according to claim 1, wherein the static data further comprises one or more of: time-of-day, location of the user device, type of the user device, target urls, parent page, and other hardware properties of the user device.

13. The computer implemented method according to claim 4, wherein the dynamic data further comprises one or more of: type of input used by the user for a latest or any previous data collection process, and any data collection process that has been shown to the user.

14. The computer implemented method according to claim 1, wherein the static data is retrieved from a memory unit on the user device.

15. The computer implemented method according to claim 1, further comprising, reading, at the user device, information from a local storage on the user device, presenting the read information on the user device, and prompting the user to confirm the presented information.

16. The computer implemented method according to claim 1, wherein the code, when executed by the user device, is configured to present a plurality of predefined options on the user device and prompt the user to select one of the plurality of predefined options.

17. The computer implemented method according to claim 16, wherein the predefined options are based on the static data, on the dynamic data, and/or or on previously provided information.

18. The computer implemented method according to claim 1, wherein generating the code for the data collection process comprises selecting a data collection process template from a data collection template library.

19. The computer implemented method according to claim 18, wherein the data collection template library is stored on the third-party server.

20. The computer implemented method according to claim 1, wherein the machine learning algorithm is configured to modify the generation of the code for the data collection process based on the user interaction with a previously generated data collection process.

21. A system for generating code for implementing a data collection process between a user device and a service-provider server, the system comprising: a third-party server having at least one processor, the processor of the third-party server being configured to:
  pre-store a graphical profile of an website of a service provider to allow data collection modules to be generated to have a graphical profile similar to the website of the service provider;
  receive, from the service-provider server, an instruction to begin the data collection process for a user operating on the user device;
  receive, static data from the user device, the static data comprising a network latency state of the user device during the data collection process;
  determine, a required set of data of a number of data items to be collected by the service-provider server from the user operating on the user device;
  scan, the service provider website to identify a visual appearance of the service provider website, and based on said identified visual appearance, further generating the code for a first data collection module to be styled to match the graphical profile of the service-provider website without any prior knowledge of the service provider, wherein the generating of the code for implementing the data collection process is further based on: (i) dynamic data comprising one or more of: keystroke latency and median latency per input field group, and further based on (ii) the static data;
  provide, the code to the user device such that the code is executed by the user device to collect the data items from the required set of data and to transmit the collected data items to the service-provider server;
  adapt a machine learning algorithm, to change a choice of the data collection modules for same type of the user and the user device in response to the first data collection module being detected as aborted by the user;
  modify the generated code further for each of the data collection modules based on the user's interaction with the first data collection module, wherein a particular visual appearance of each of the data collection modules is further modified by the machine learning algorithm;
  repeat the generating of the code and the providing of the code to the user device until the third-party server determines that the user has provided all of the required set of data to the service-provider server;
  receive, confirmation that the user of the user device has provided the collected data items to the service-provider server; and
  determine, based on the received confirmation, that the user has provided the required set of data collected from the user to the service-provider server.

22. A non-transitory computer readable medium comprising instructions for generating code for implementing a data collection process between a user device and a service-provider server, said instructions executed by a processor of a third-party server to:
  pre-store a graphical profile of an website of a service provider to allow data collection modules to be generated to have a graphical profile similar to the website of the service provider;
  receive, from the service-provider server, an instruction to begin the data collection process for a user operating on the user device;
  receive, static data from the user device, the static data comprising a network latency state of the user device during the data collection process;
  determine, a required set of data of a number of data items to be collected by the service-provider server from the user operating on the user device;
  scan, the service provider website to identify a visual appearance of the service provider website, and based on said identified visual appearance, further generating the code for a first data collection module to be styled to match the graphical profile of the service-provider website without any prior knowledge of the service provider, wherein the generating of the code for implementing the data collection process is further based on: (i) dynamic data comprising one or more of: keystroke latency and median latency per input field group, and further based on (ii) the static data;
  provide, the code to the user device such that the code is executed by the user device to collect the data items from the required set of data and to transmit the collected data items to the service-provider server;
  adapt a machine learning algorithm, to change a choice of the data collection modules for same type of the user and the user device in response to the first data collection module being detected as aborted by the user;
  modify the generated code further for each of the data collection modules based on the user's interaction with the first data collection module, wherein a particular visual appearance of each of the data collection modules is further modified by the machine learning algorithm;
  repeat the generating of the code and the providing of the code to the user device until the third-party server determines that the user has provided all of the required set of data to the service-provider server;
  receive, confirmation that the user of the user device has provided the collected data items to the service-provider server; and determine, based on the received confirmation, that the user has provided the required set of data collected from the user to the service-provider server.

\* \* \* \* \*